Oct. 13, 1953   J. HOHL ET AL   2,655,302
MACHINE FOR APPLYING SCREW CAPS TO CONTAINERS
Filed Dec. 19, 1949   5 Sheets-Sheet 1

Inventors
JOHN HOHL
R. A. PIM

By Rule and Hoge,
Attorneys

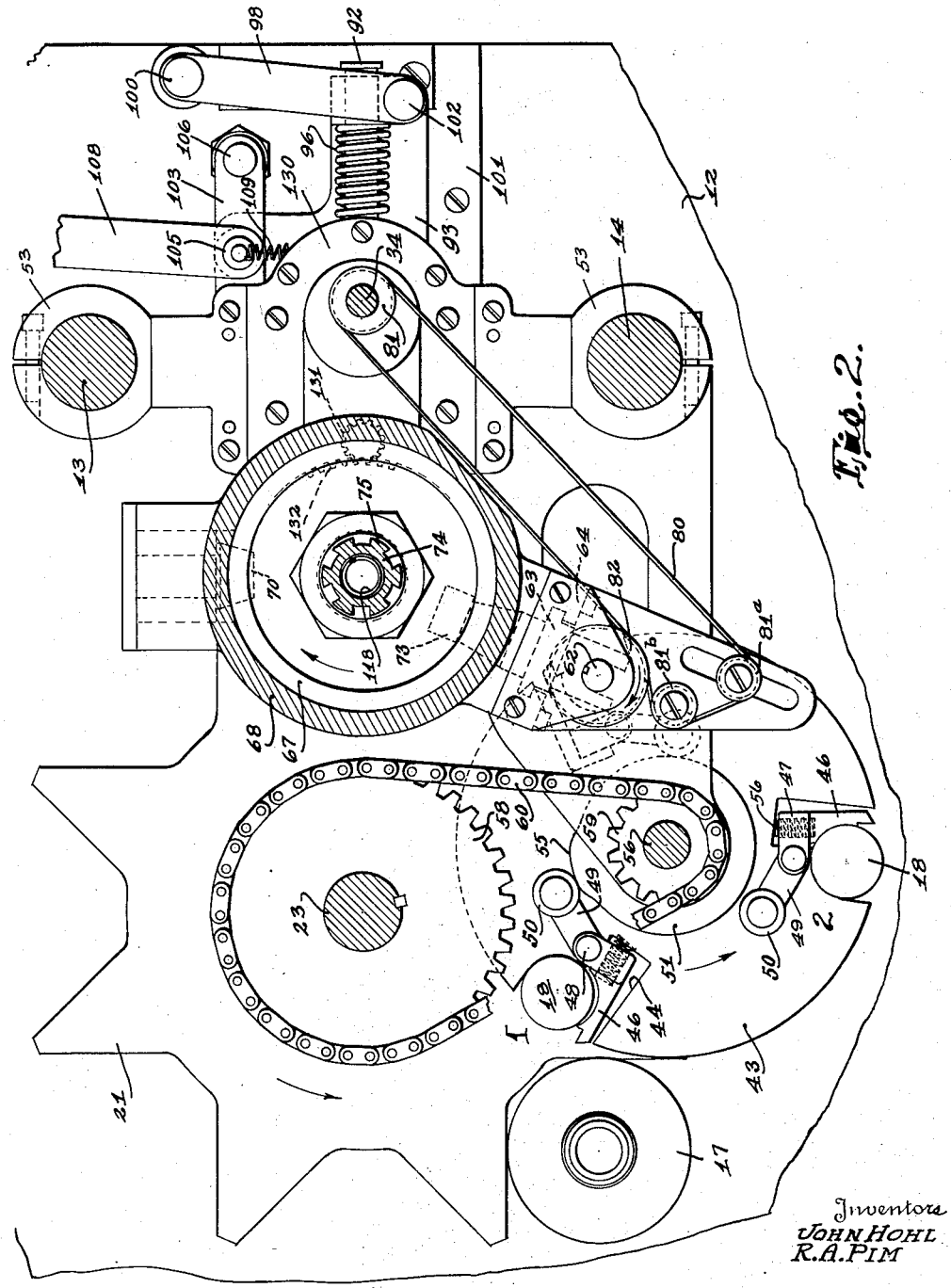

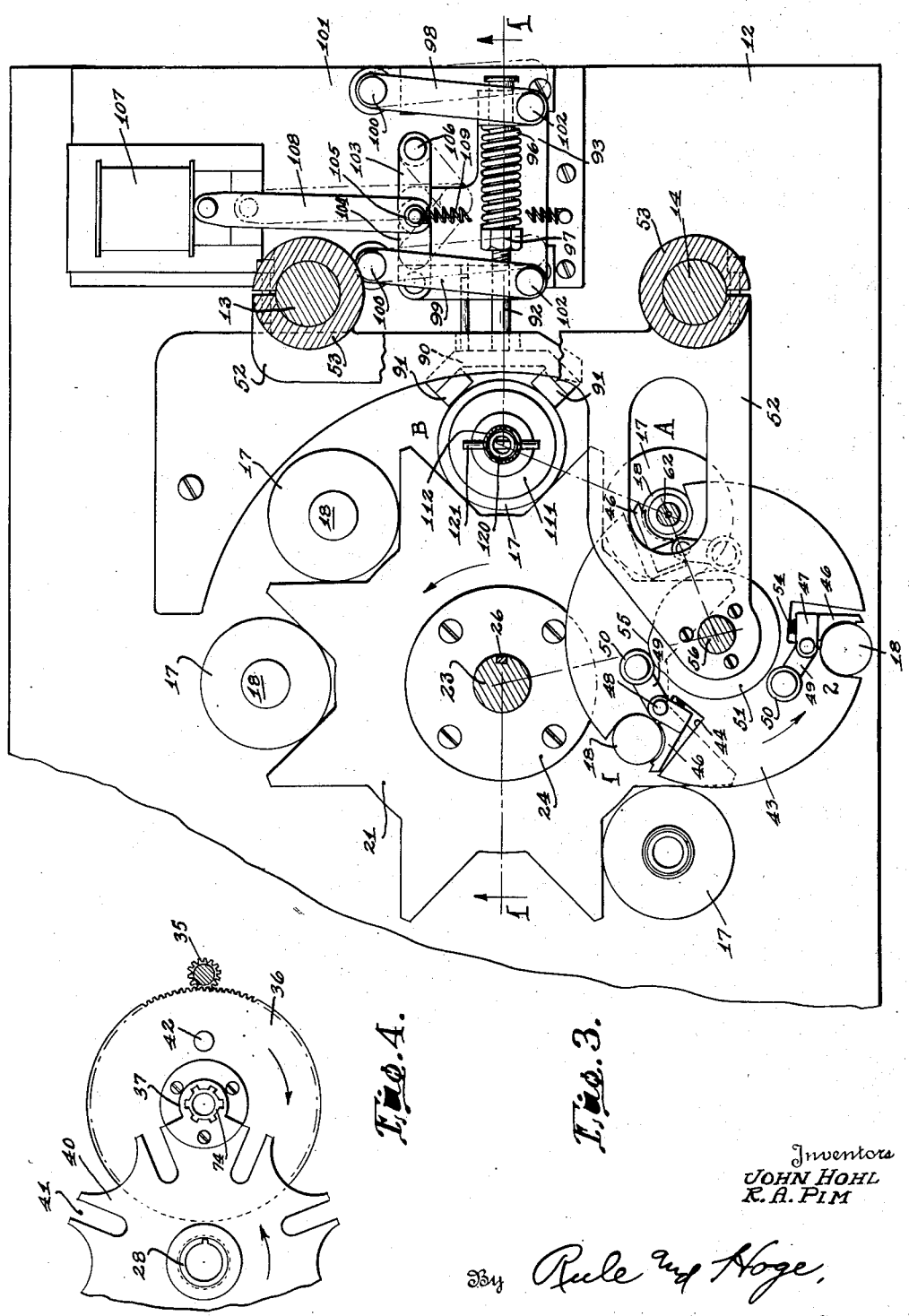

Oct. 13, 1953  J. HOHL ET AL  2,655,302
MACHINE FOR APPLYING SCREW CAPS TO CONTAINERS
Filed Dec. 19, 1949  5 Sheets-Sheet 4

Inventors
JOHN HOHL
R. A. PIM

By Rule and Hoge,
Attorneys

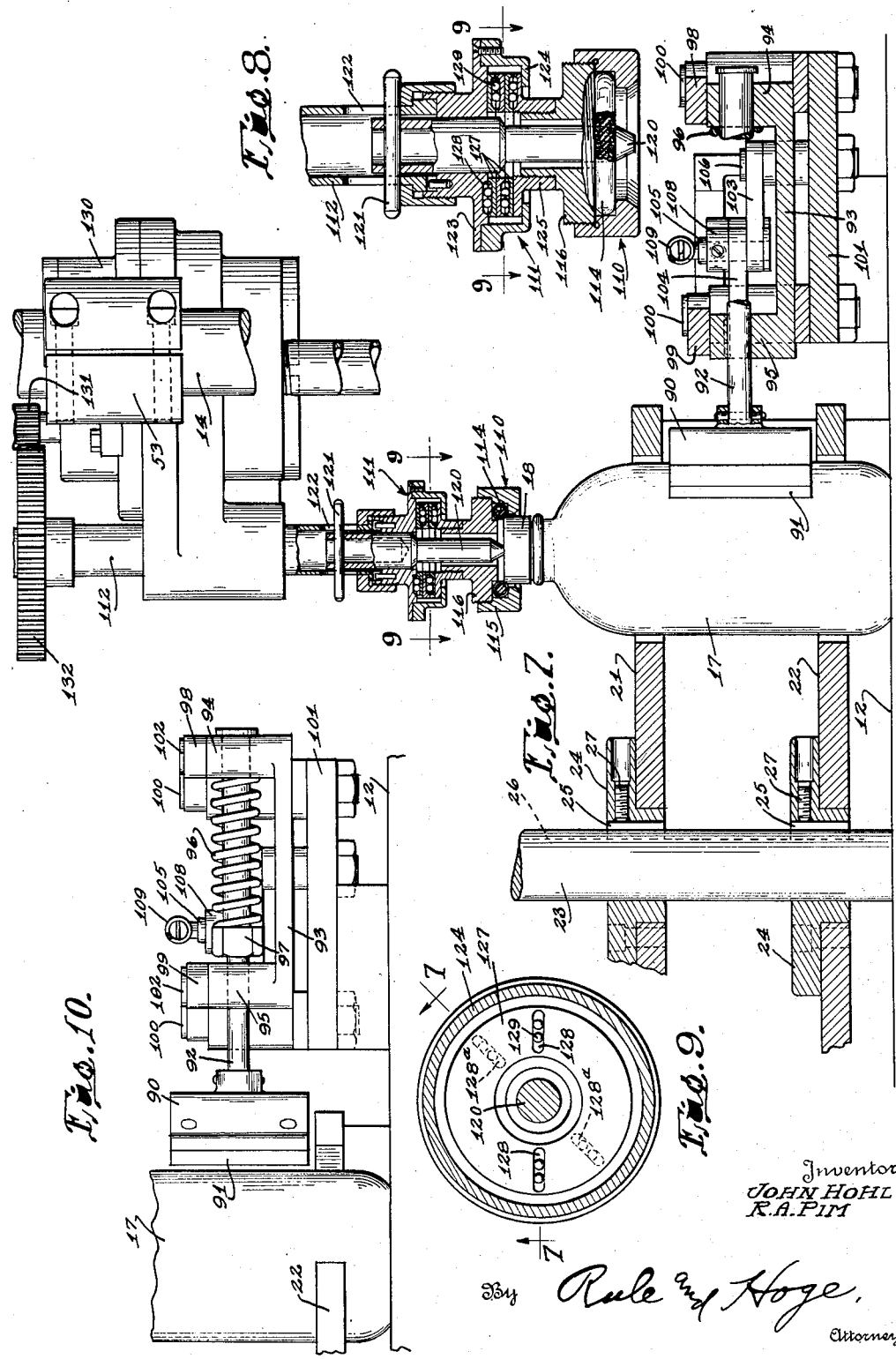

Patented Oct. 13, 1953

2,655,302

UNITED STATES PATENT OFFICE 2,655,302

MACHINE FOR APPLYING SCREW CAPS TO CONTAINERS

John Hohl and Richard A. Pim, Toledo, Ohio, assignors to Owens-Illinois Glass Company, a corporation of Ohio Application December 19, 1949, Serial No. 133,734

15 Claims. (Cl. 226—88)

Our invention relates to a machine for applying screw-type caps to containers such as bottles and jars and screwing the caps to sealing position on the containers. The machine is adapted for capping and sealing containers supplied to the machine in rapid succession.

In sealing bottles or the like with screw caps, on a commercial scale, it is important that a uniform degree of torque be applied in screwing the caps to sealing position, so that all of the caps are uniformly tight. The torque must be sufficient to insure a perfect seal, but excessive torque which would cause damage must be avoided.

An object of the present invention is to provide accurate and reliable means for obtaining such uniformity and thereby overcoming various difficulties and deficiencies of prior art machines. For the attainment of this object a hydraulic motor is employed for tightening the caps on the containers, the motor being driven by fluid supplied at a predetermined pressure. The motor is connected through gearing to a chuck which rotates the caps into sealing position. The fluid pressure is such that the motor is stalled when the cap has been tightened to the desired degree, the pressure being adjustable so that the torque applied to the caps can be adjusted.

The use of such hydraulic system embodies important advantages over the usual methods in which mechanical clutches are used. With the hydraulic motor, the static inertia of the moving parts is very small so that in stopping the chuck, the inertia is practically negligible. This permits the tops to be tightened in rapid succession with a uniformly applied torque. The hydraulic fluid provides a very effective cushioning when the cap is tightened. It also provides a soft steady motion of the cap-tightening mechanism free from impacts which tend to break the molded caps.

An important feature of the invention relates to the accurate control of the torque permitted by the use of the hydraulic system and obtained by controlling the fluid pressure supplied to the motor, which pressure can be varied and can be held with great accuracy and ease. In this manner difficulties inherent in conventional cappers which employ mechanical clutches are avoided. In such mechanical devices, the torques are extremely hard to control and are very irregular with a constant variation of the torques delivered.

A further objection to conventional cappers with multiple heads is due to the fact that it is extremely difficult to adjust all the chucks so that they will deliver approximately the same torques. In accordance with the present invention employing hydraulic means, all of the fluid motors in a unit are driven by fluid in a single supply line and all operate at exactly the same pressure, and therefore, deliver the same torque to all of the cap-tightening chucks.

A further advantage of the hydraulic motor is that it is equally efficient in applying large, as well as small caps, to containers and is readily adjustable to any size cap, and degree of torque applied thereto, by merely changing the pressure in the supply line by adjustment of the conventional automatic valve means employed for such purpose.

The present invention is herein illustrated as adapted for applying screw caps to bottles having screw-threaded necks and will be so described, it being understood that other types of containers and other forms of screw-type caps may be used with such machine and within the scope of our invention. By the term "screw-type cap" is meant any cap which is applied to the container by screwing or spirally rotating the cap to bring it to sealing position, the cap and container neck having coöperating surfaces by which the cap is drawn spirally downward into sealing position when rotated.

The machine comprises means for advancing the containers seriatim to a cap-receiving station at which caps are applied to the bottle necks and screwed lightly into position. Each bottle with a cap thus applied is then indexed to a second or cap-tightening station at which the cap is given a further rotation to bring it into sealing position.

The means for bringing the bottles to said stations includes a pair of indexing disks or wheels in the form of star wheels which are rotated intermittently step by step to advance each bottle first to the cap-receiving station at which a cap is applied, then to the cap-tightening station where the sealing operation takes place, and thereafter discharging the sealed bottle. The caps are brought in succession to the cap-receiving station by means of a cap-carrying disk rotated intermittently step by step in synchronism with the movements of the star wheels.

Referring to the accompanying drawings which illustrate a preferred form of our invention:

Fig. 2 is a sectional plan view at the line 2—2 on Fig. 1, on a larger scale;

Fig. 3 is a section at the line 3—3 on Fig. 1;

Fig. 4 is a fragmentary view of a Geneva drive for intermittently advancing the bottles and caps;

Fig. 7 is a fragmentary part sectional elevation of the machine showing the indexing star wheels, means for clamping the bottles to the star wheels at the cap-tightening station and the means for tightening the caps;

Fig. 8 is a sectional view showing the cap-tightening chuck also shown in Fig. 7, but on a larger scale than in Fig. 7;

Fig. 9 is a section at the line 9—9 on Figs. 7 and 8, the section line 7—7 on Fig. 9 indicating the planes of section of the chuck as shown in Fig. 7; and Fig. 10 is an elevational view of the means for clamping the bottles at the cap-tightening station.

The machine is mounted on stationary base 12 from which rises a pair of posts 13 and 14. The machine framework includes a casing 15 (Fig. 1) within which certain moving parts of the machine are mounted. Said casing includes a lower plate 16 which is supported on the posts 13 and 14 and may be adjustable up and down thereon to adapt the machine to containers of different heights.

Figure 6:
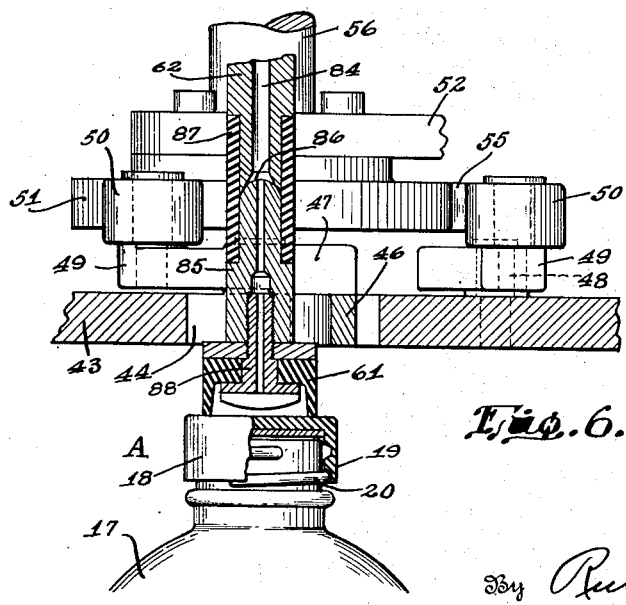
Fig. 6 is a fragmentary sectional elevation at the line 6—6 on Fig. 5, showing the suction chuck for holding the caps and applying them to the bottles.

The containers, herein shown as bottles 17, are closed and sealed with caps 18. As shown in Fig. 6, each cap comprises a flat top and a depending circumferential skirt 19 formed on the inner surface with a screw thread which cooperates with a screw thread 20 formed on the bottle neck.

A pair of star wheels 21 and 22 are keyed to a vertical shaft 23 which is rotated intermittently to advance each bottle first to a cap-applying station A at which the cap is loosely applied to the bottle and then to the cap-tightening station B. The two star wheels are attached to the shaft 23 as shown in Fig. 7 by means of hubs 24, each carrying a key 25 which fits in a vertical spline or groove 26 in the shaft and is clamped by a set screw 27. By loosening the set screws, the star wheels may be individually adjusted to accommodate bottles or containers of different heights. A tubular shaft 28 (Fig. 1) telescopically connected with the shaft 23 provides an adjustable extension of the latter. The section 28 has a driving connection with the shaft 23 through a key 29 slidable in the spline groove 26. The shaft 28 is journaled in a cylindrical bearing sleeve 30 depending from the plate 16.

The star wheel shaft 23 is rotated intermittently by an electric motor 31 (Fig. 1) having driving connection with the shaft through gearing which will now be described. The motor 31 is geared to a driving belt 32 which drives a pulley 33 on a vertical shaft 34 journaled in the casing 15. A pinion 35 keyed to the shaft 34, drives a gear 36 bolted to a hub 37 journaled by means of ballbearings 38 in the frame plate 16. The gear 36 has driving connection with the shaft 28, 23, through a Geneva drive (Figs. 1 and 4) of conventional form, comprising a disk 40 keyed to the shaft 28 and formed with radial slots 41 which are engaged by a pin 42 on the gear 36. The continuous rotation of the gear 36 imparts step by step movement to the shaft 28 and star wheels 21, 22. Each star wheel as shown, comprises eight points, spaced at angular distances of 45°. Each step movement of the driving disk 40 advances the star wheel through an angle of 45°, thereby advancing a bottle from station A to station B.

Figure 1:
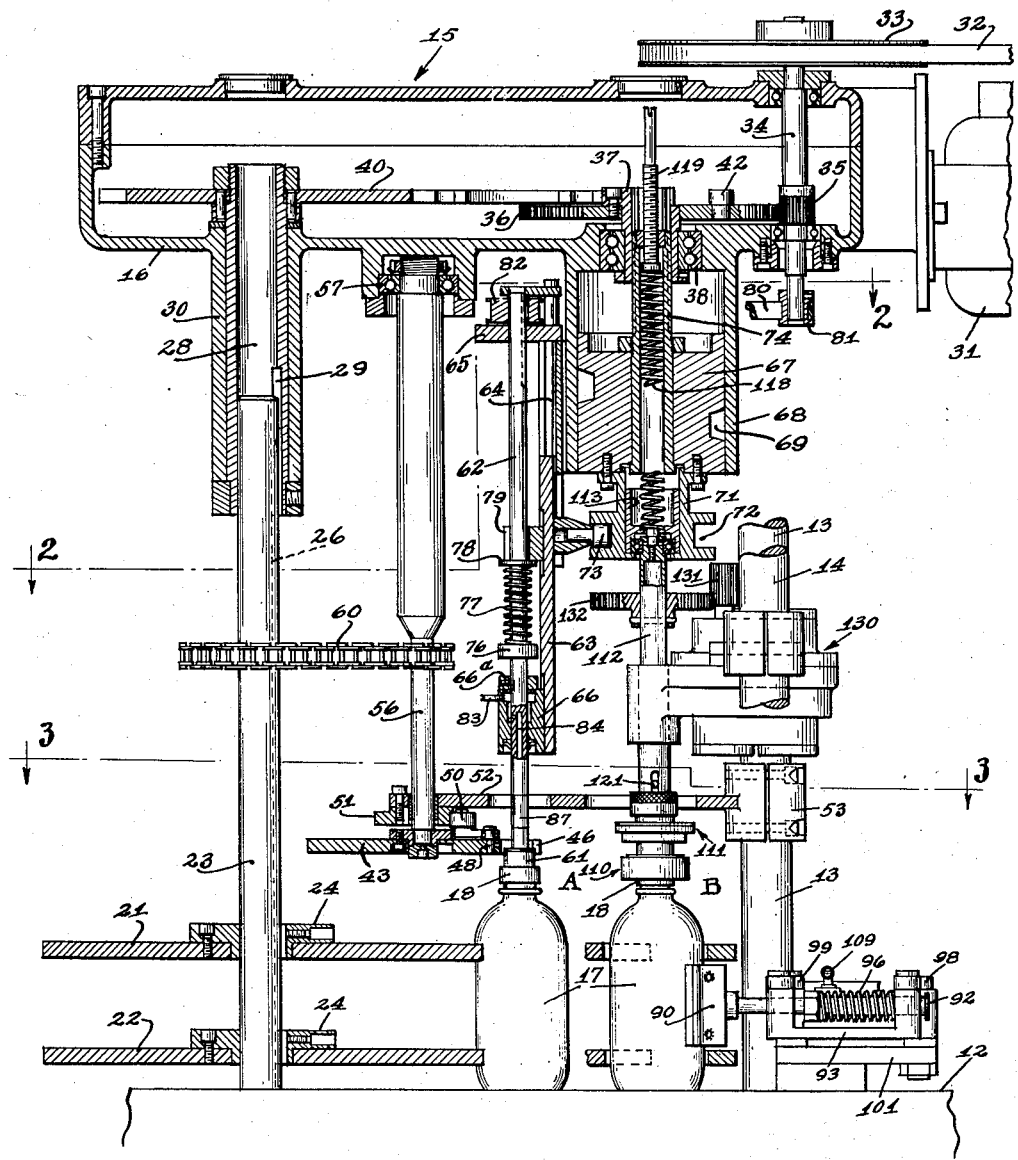
Fig. 1 is a vertical sectional elevational view of a machine, the section being substantially at the irregular section line 1—1 on Fig. 3 and the view being developed to bring the vertical planes of the section line into a single plane.
Figure 5:
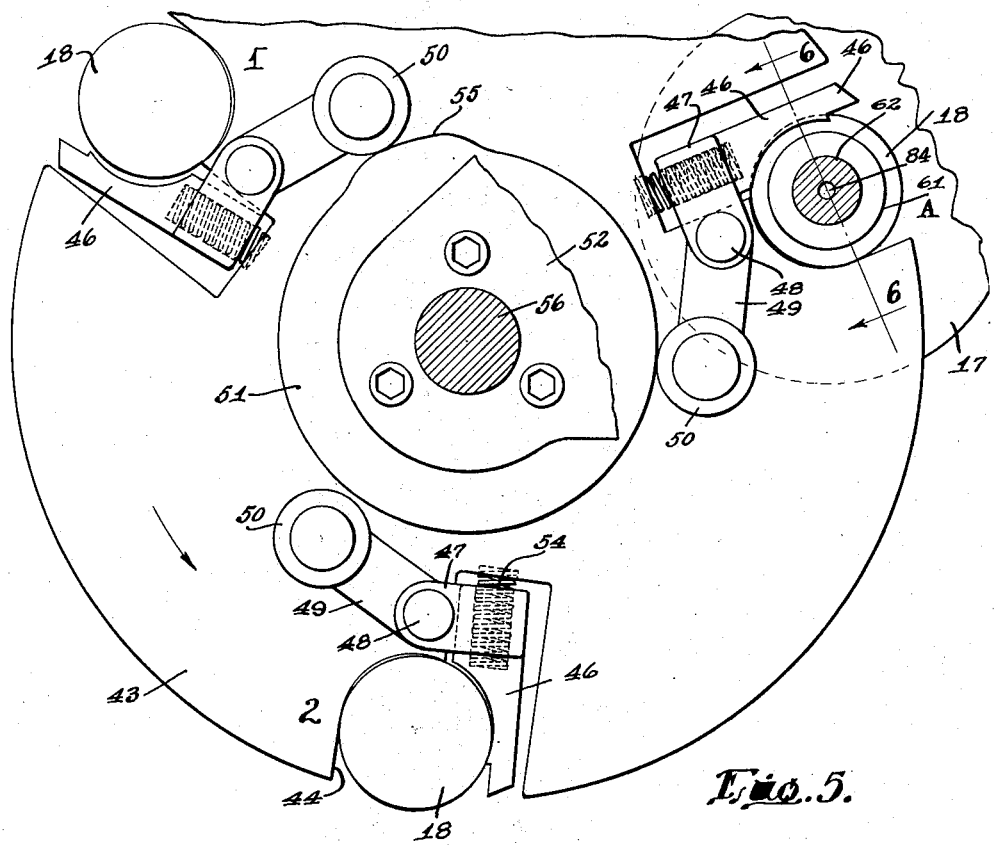
Fig. 5 is a fragmentary sectional plan view on a comparatively large scale, of the cap indexing disk and cap-gripping devices.

The caps 18 are fed either by hand or automatically, to a carrier disk 43 by which they are advanced to Station A, each cap being brought directly over and into register with the bottle at said station. The disk carrier 43 (Figs. 2, 3, and 5) is formed with recesses or pockets 44 at intervals around its periphery, each pocket being of a size to receive a bottle cap 18. The caps are clamped to the disk by means of gripping devices, each comprising a gripping jaw 46 attached to a rock arm 47 fixed to a pivot pin 48 journaled in the disk. A second rock arm 49 keyed to the pin 48 carries a cam follower roll 50 which runs on a stationary cam disk 51 mounted on the underside of a plate 52 (Fig. 1). The plate 52 is attached to the posts 13 and 14 by means of clamping collars 53. The clamping jaw 46 is held in cap-gripping position by a compression coil spring 54.

The carrier 43 is rotated as presently described, to bring each pocket to three stations in succession, namely, a cap-receiving station 1, an intermediate station 2, and the cap-applying station A. The cam disk 51 is formed with a cam lobe 55 so positioned that when the carrier disk 43 is at rest, the gripping jaw 46 at the receiving station 1 is held retracted by the cam, thus permitting a cap 18 to be placed in the pocket 44 while the disk is at rest. Upon the commencement of the next indexing movement of the disk, the cam roll 50 runs off the cam lobe 55 so that the cap is gripped.

The disk 43 is keyed to the lower end of a vertical shaft 56, the upper end of which is journaled in bearings 57 on the underside of the plate 16. The shaft 56 is rotated intermittently in synchronism with the indexing movements of the star wheels, being driven from the shaft 23 through gearing including a sprocket chain 60 trained over sprocket gears 58 and 59 keyed to the shafts 23 and 56 respectively. The gears are so proportioned that the cap-carrying disk 43 is rotated through 120° during each step rotation of the star wheels through 45°, so that during each step movement, a cap 18 and bottle 17 are brought into register at station A.

The mechanism for applying the cap to the bottle and lightly screwing it into position is as follows: A cap-gripping chuck 61 (Figs. 1 and 6) in the form of an inverted rubber cup is adapted to grip the cap by suction, push the cap downward out of the pocket 44 onto the bottle neck and then rotate the cap and screw it lightly into position. For this purpose the chuck 61 is attached to the lower end of a vertical chuck spindle 62 mounted for rotation and for up and down movement. A vertical slide bar 63, mounted for up and down movement in guide rails 64 attached to a stationary cross bar 65, has connection with the spindle for lifting the latter. Such connection includes a head 66 attached to said slide bar and a collar 66ᵃ keyed to the spindle 62.

The slide bar 63 is moved up and down in timed relation to the indexing movements of the cap-carrying disk 43, by means of a lifting device in the form of a cylindrical cam block 67 which is movable up and down in a cylindrical casing 68 formed integral with and depending from the plate 16. The cam block is formed with an endless cam groove 69 in which runs a cam roll 70 (Fig. 2) having a stationary mounting in the machine frame. The cam is connected to the slide bar 63 through a connecting member 71 formed with a peripheral groove 72 in which runs a roll 73 connected to the slide bar 63. The cam 67 is driven by the gear 36 operatively connected thereto through a tubular shaft 74 to which the cam is attached. The gear 36 has a driving connection with the shaft, comprising ribs 75 (Fig. 2) formed on the shaft and engaging cooperating ribs on the hub 37. A coil spring 77 mounted on the spindle is held under compression between a collar 76 fixed to the spindle, and a ring 78 loose on said stem and bearing against the lower side of a stop block 79 fixed to the slide bar 63. The chuck spindle 62 is rotated continuously by means of a light belt 80 trained over a drive pulley 81 keyed to the lower end of the shaft 34 and idler pulleys 81ᵃ and 81ᵇ (Fig. 2), the pulley 81ᵃ being adjustable to vary the tension of the belt. The belt runs in contact with a driven pulley 82 having a splined connection with the spindle 62, thereby rotating the spindle while permitting up and down movement thereof.

During the rotating movement of the cap-holding disk 43, the chuck 61 is held in its upper position above the plane of the disk. When a bottle cap 18 has been positioned over the bottle at station A, the slide bar 63 is lowered, permitting the rotating chuck spindle to be moved downwardly under the pressure of the spring 77, thereby forcing the cap out of the pocket 44 onto the bottle and rotating the cap into position. When the top of the cap is brought into contact with the top surface of the bottle, the frictional resistance stops the rotation of the cap and spindle, causing slippage of the belt 80 which lightly contacts with the pulley 82.

In order to apply suction to the chuck 61 for gripping the cap, the air is exhausted through a vacuum or suction pipe 83 (Fig. 1) which opens into a valve chamber in the head 66 which functions as a valve, said chamber being in communication with the chuck through a bore 84 extending downward through the spindle 62 to the chuck. When the slide bar 63 is lifted, it brings the valve member 66 into contact with the collar 76, closing the suction line, and then lifts the chuck off the bottle cap.

In order to permit the chuck 61 to adjust itself to the bottle cap, and make a tight seal therewith, the chuck is attached to a short stem 85 (Fig. 6) forming a lower end portion of the spindle 62. The adjoining ends of the spindle sections are in the form of a ball and socket joint 86. A sleeve 87, consisting of rubber or similar material, surrounds said joint and is adhered to the spindle sections, thereby providing an airtight connection at said joint. The chuck 61 is secured to the stem by means of a screw bolt 88 which permits the chuck 61 to be quickly removed and replaced by others adapted to caps of other sizes or shapes.

After a cap has been attached to a bottle at station A the star wheels are given a step rotation to bring the bottle to the cap-tightening station B. The bottle is clamped to the star wheel at this station by a clamping device 90 comprising a pair of clamping jaws faced with pads 91 of rubber or like material, for gripping the bottle. The clamp is provided with a stem 92 supported in a carrier 93 or cradle, formed with upright arms 94 and 95, said arms formed with aligned openings through which the stem 92 loosely extends. A coil spring 96 mounted on the stem 92, is held under compression between the arm 94 and a nut 97 which is threaded on the stem and is adjustable for regulating the compression of the spring. The spring operates to yieldingly hold the clamp 90 in bottle-gripping position.

Means for withdrawing the clamp include a pair of parallel links 98 and 99 each attached at one end by a pivot 100 to a stationary plate 101. The opposite ends of the links are connected by pivots 102 to the carrier 93. A pair of toggle links 103 and 104 are connected by a pivot pin 105. The link 103 swings about a stationary pivot pin 106. The outer end of the link 104 is pivoted to the carrier 93. The toggle links are actuated by any suitable means, mechanical or electrical, operating in synchronism with and in timed relation to the indexing movements of the star wheels. As herein shown, the links are actuated by an electromagnet or solenoid 107. The magnet core is connected through a link 108 to the pivot pin 105. When the magnet is energized, it operates through the link 108 to straighten the toggle to the full line locking position (Fig. 3) in which the clamp 90 is held in bottle-gripping position by the compression spring 96. When the electromagnet is de-energized, the toggle links are drawn to the dotted line position (Fig. 3) by a coil spring 109, thereby moving the carrier 93 outwardly and thus withdrawing the clamp. This releases the bottle at station B, permitting the next indexing operation by which the next succeeding bottle is brought to the cap-tightening station.

The cap-tightening means (as shown in Figs. 1, 7 and 8) comprises a chuck 110 connected through an adapter 111 to the lower end of a vertical tubular chuck shaft 112, the upper end of which is journaled for rotation within a tubular slide member or head 113 movable up and down within the connector 71. The chuck 110 includes a gripping ring 114 mounted within the chuck casing, the latter including a removable cap 115 threaded onto a member 116. The gripping ring 114 may consist of rubber or the like, in which is embedded a coil spring which may extend throughout the circumference of the ring. As shown in Fig. 7, the ring engages the upper corner or margin of the cap so that the cap is wedged into the ring in a manner to provide an effective grip preventing any slippage while the cap is tightened on the bottle.

The chuck shaft 112 is in vertical alignment with the tubular cam shaft 74 (Fig. 1) and is moved up and down by the cam 67 connected to the chuck shaft through the connector 71. The final downward movement of the cam is after the chuck 110 is seated on the bottle cap. A coil compression spring 118 within the tubular shaft 74 applies a yielding pressure to the chuck during its final downward movement whereby the chuck is held in gripping engagement with the bottle cap when the cam 67 is in its lowered position. The spring 118 is held under compression between the head 113 and a stop screw 119 having a screw-threaded connection with the shaft 74, the stop screw being adjustable to regulate the pressure applied through said spring to the chuck.

A pin 120 is mounted within the lower end of the chuck spindle 112 and extends downwardly through the adapter 111 and the chuck in position to contact the bottle cap when the chuck is lowered. The pin is free for limited up-and-down movement relative to the chuck and its shaft and is connected for rotation with the chuck by means of a cross pin 121 extending through slots 122 in the shaft 112, said slots limiting the up-and-down movement of the pin 120.

The adapter 111 is constructed to permit lateral shifting movement of the chuck relative to the shaft 112 horizontally in any direction. This permits the chuck to adapted itself to any bottle cap and bottle which may not be in exact vertical alignment with the chuck spindle 112. The adapter comprises an upper plate 123 and a lower plate 124 bolted together and providing a housing for ballbearings. A flanged sleeve 125 screw threaded onto the chuck member 116 connects the chuck to the adapter and permits lateral movement of the chuck relative to the adapter in any direction. Within the housing formed by members 123 and 124, are disks 127, each formed with diametrically opposite radial pockets or recesses 128 in its upper face (see Fig. 9) for bearing balls 129 and similar pockets 128$^a$ in its under face, permitting relative lateral movement of said disks, and of the chuck relative to the adapter, thereby permitting lateral shifting of the chuck for adjusting itself to the position of the bottle cap if the cap is off center relative to the chuck shaft 112.

The chuck 110 is rotated for tightening the cap by power supplied through a hydraulic motor 130 (Figs. 1 and 7) which may be a hydraulic pump of standard construction. The motor comprises a driving pinion 131 running in mesh with a gear wheel 132 keyed to the chuck shaft 112. The hydraulic pressure of the pump driving fluid is accurately controlled by sensitive relief valves which are adjustable to regulate the pressure. The adjustment is such that when the cap is tightened to the desired degree, the hydraulic motor is stalled. By this means a uniform predetermined maximum torque is developed for each cap-tightening operation so that all the caps are uniformly tightened.

*Operation*

A résumé of the operation is as follows: the star wheels 21, 22 and cap-carrying disk 43 are simultaneously rotated step by step, each step rotation bringing a cap and bottle to the cap-applying station A and simultaneously advancing a bottle with a cap applied thereto, to the cap-tightening station B. When a bottle and cap are brought to rest at the station A, the cam 67 operates to move the chuck spindle 62 downward and bring the suction cup or chuck 61 into contact with the cap, gripping it by suction, then forcing it downward out of the carrier 43 onto the bottle neck. The chuck spindle at this time is being rotated by the friction driving belt 80 (Fig. 2) so that the cap when it makes contact with the bottle, is screwed downward until it seats on the top of the bottle and is thereby arrested, the belt 80 then slipping without sufficient torque being developed to seal the cap on the bottle.

When the bottle with the cap thus loosely applied thereto, is advanced to the cap-tightening station B, the clamp 90 is actuated to clamp the bottle tightly to the star wheel. The chuck 110 is then lowered and firmly grips the bottle cap while the chuck is being rotated by the hydraulic motor 130. This operates to tighten the cap thereby sealing the container. When the predetermined degree of torque has been built up, and the cap tightened to the desired degree, the resistance to further rotation stalls the hydraulic motor. This torque is accurately determined by regulating the pressure of the driving fluid so that all of the bottle caps are tightened to a uniform degree. Although the operation has been described as sealing the caps on the containers, the machine may be used for applying and tightening caps which are not adapted or intended to hermetically seal the containers.

Modifications may be resorted to within the spirit and scope of our invention as defined in the appended claims.

We claim:

1. A machine for applying screw caps to containers, comprising a container advancing device mounted for rotation about a vertical axis, means for rotating said device intermittently step by step and thereby bringing containers singly and in succession to a cap-applying station and advancing the containers one by one from the said cap-applying station to a cap-tightening station, a cap carrier mounted for rotation about a vertical axis, interconnecting gearing between the cap carrier and the container advancing device by which the cap carrier is rotated step by step concurrently with the step movements of the container advancing device, cap holding devices on the cap carrier positioned and arranged to bring the caps in succession to the cap-applying station and position the caps over and in register with the containers at said station as the cap carrier is rotated about its vertical axis, means for transferring the caps from said carrier downwardly onto the containers at the cap-applying station, and means at the cap-tightening station to grip the caps and rotate them to sealing position on the containers.

2. A machine for applying screw caps to containers and tightening the caps, said machine comprising a cap-tightening chuck, a vertical shaft mounted for rotation about its axis and for up-and-down movement, means connecting the chuck to the lower end of the shaft, means for positioning a container with a cap loosely mounted thereon in a position beneath and in register with the chuck, mechanism for lowering said shaft and chuck and causing the chuck to grip the cap, means for rotating said shaft and chuck comprising a hydraulic pump and gearing forming driving connection between the said pump and said shaft, said mechanism including spring means operating independently of power supplied by the hydraulic pump to maintain the chuck in gripping engagement with the cap during said rotation by the hydraulic pump, and means for lifting the shaft and chuck.

3. The combination set forth in claim 2 wherein the means for lifting and lowering the shaft and chuck comprises a lifting device positioned over said shaft, means for moving the lifting device up and down, and means providing a lost motion connection between the said shaft and lifting device, permitting limited up-and-down movement of the shaft relative to the lifting device, the said spring means comprising a compression spring arranged to apply downward pressure to the shaft and chuck for causing the latter to grip the cap when the lifting device is lowered.

4. A machine for capping containers comprising means for positioning the containers at a cap-tightening station, means for clamping the containers in a fixed position at said station, said clamping means comprising a clamping device mounted for movement toward and from the container at said station, a stem attached to the clamping device and extending in the direction of its said movement, a carrier in which said stem is supported, a pair of parallel links each pivoted at one end to said carrier and at its opposite end pivoted to a stationary support, a pair of toggle links, one of which is pivoted to said carrier, the other of which is pivoted to the stationary support, means for actuating the toggle for withdrawing the clamp from the container, and a compression spring interposed between the said carrier and clamp for moving the latter to clamping position.

5. A machine for applying screw-type caps to containers and tightening the caps, comprising a cap-applying chuck and a cap-tightening chuck, each mounted for rotation about a vertical axis and for up and down movement, said chucks being spaced apart laterally and positioned respectively at a cap-applying station and a cap-tightening station, means for moving the containers singly and in succession to the cap-applying station and for concurrently moving the caps to the cap-applying station and positioning each cap over and in register with a container at said station with the container and cap beneath the cap-applying chuck, means for lowering the cap-applying chuck and causing it to grip the cap and move the cap downward onto the container, a motor, means providing a friction driving connection between the motor and the cap-applying chuck for rotating the chuck and thereby screwing the cap loosely onto the container, means for transferring each container with the cap thereon to the cap-tightening station with the container and its cap beneath and in register with the cap-tightening chuck, means for lowering the latter and causing it to grip the cap, a second motor, means providing a driving connection between said second motor and the cap-tightening chuck for rotating the latter and thereby tightening the cap on the container to a predetermined degree of tightness at which the motor is stopped by the resistance of the cap to further rotation on the container.

6. A machine for applying screw caps to containers and tightening the caps on the containers, comprising a cap-applying chuck and a cap-tightening chuck, a chuck lifting device positioned over the cap-tightening chuck and mounted for up-and-down movement, means providing a lost motion connection between said device and the cap-tightening chuck for lifting the latter device when said device is moved upward and permitting a limited downward movement of the said device relative to the chuck when said device is lowered, a motor, means providing driving connections between the motor and said lifting device for moving the latter up and down, a spring means for applying a yielding downward pressure to the cap-tightening chuck during the final downward movement of said lifting device while the chuck is engaged with the cap, means providing an operating connection between said lifting device and the cap-applying chuck including a connector operatively connected to said lifting device and moved up and down therewith, and means providing a lost motion connection between said connector and the cap-applying chuck operative to lift the chuck when said connector is moved upwardly and permitting a limited downward movement of the connector relative to the chuck when said connector is lowered, and spring means interposed between said connector and the cap-applying chuck for applying a yielding downward pressure of the chuck on the cap when said connector is lowered.

7. The machine as described in claim 6 wherein said chuck lifting device consists of a cylindrical cam mounted for rotation about a vertical axis and geared to the motor, said axis being in line with the cap-tightening chuck, the connection between said chuck lifting device and cap-tightening chuck comprising a chuck spindle rotatable about said axis independently of the rotation of said lifting device, a second motor, and means providing driving connections between the second motor and said chuck spindle for rotating the latter.

8. A machine as defined in claim 7, said connector comprising a slide member connected to move up and down with said lifting device, a chuck spindle to which the cap-applying chuck is attached and having a lost motion connection with said connector permitting limited up-and-down movement of the chuck relative to said connector, spring means interposed between the cap-applying chuck and said connector for applying a yielding downward pressure to the chuck when said connector is lowered, and means for rotating said last-mentioned chuck spindle and chuck.

9. A machine as defined in claim 6, said connector comprising a slide member connected to move up and down with said lifting device, a chuck spindle to which the cap-applying chuck is attached and having a lost motion connection with said connector permitting limited up-and-down movement of the chuck relative to said connector, spring means interposed between the cap-applying chuck and said connector for applying a yielding downward pressure to the chuck when said connector is lowered, and means for rotating said last-mentioned chuck spindle and chuck.

10. In a machine for applying screw-type caps to containers, a cap carrier mounted for rotation about a vertical axis, a cap holding device mounted on said carrier, means for holding a container stationary at a cap-receiving station, means for rotating said carrier and thereby bringing said cap holding device with a cap held thereby into register with the container at said station, a chuck positioned directly over said cap and container at the cap-receiving station and mounted for vertical movement, means for lowering the chuck while directly over and in register with the cap and container at said station and attaching it to the cap and transferring the cap from said carrier downwardly onto the container, and means for rotating the chuck and screwing the cap onto the container.

11. The combination set forth in claim 10 wherein the means for transferring the cap to the container comprises a vertical chuck spindle, the chuck being attached at the lower end of the spindle, means for attaching the chuck to the cap, and means for lifting and lowering the spindle and chuck and thereby transferring the cap from the carrier onto the container by the lowering of the spindle, the means for rotating the chuck spindle comprising a friction drive by which the torque applied to the chuck is limited to a predetermined amount.

12. The combination set forth in claim 11 wherein the means for lifting and lowering the chuck spindle includes a cam, a slide bar mounted for vertical reciprocating movement and operatively connected to the cam and actuated thereby, means providing a lost motion connection between said slide bar and the chuck spindle for lifting the latter, said connection including a coil compression spring mounted on the spindle and operating to lower the chuck and apply the cap to the container when said slide bar is lowered.

13. The combination set forth in claim 10 wherein the chuck comprises a vacuum cup adapted to seat on the cap, and means for exhausting the air from said cup when the latter is lowered onto the cap and thereby causing said cup to grip the cap.

14. A machine for applying screw caps to containers comprising a horizontal cap-carrying disk, a vertical shaft on which the disk is mounted, said disk having pockets in its periphery to receive the caps, gripping jaws mounted on the disk adjacent to said pockets, springs arranged to move the jaws into position to grip caps in said pockets, means for rotating said disk and thereby bringing said pockets in succession above and in register with containers at a cap-receiving station, a stationary cam, means actuated by the cam to swing the gripping jaws to a retracted position at the cap-receiving station, means for transferring the caps to containers at said station, said pockets with the caps therein being brought to said station in succession by the said rotation of the cap carrier, means for positioning a container at said station with the container beneath and in register with a cap at said station, a chuck mounted for up-and-down movement at said station and positioned over the cap when the latter is held by the carrier at said station, means for lowering the chuck and thereby causing it to engage the cap and carry it downward out of the carrier pocket and onto the container therebeneath, and means for rotating the chuck and thereby screwing the cap onto the container.

15. A machine for applying screw caps to containers comprising a cap-carrying disk mounted for rotation about its axis, said disk having an opening extending therethrough and forming a pocket to receive the caps, cap gripping means mounted on the disk for rotation therewith and comprising a gripping jaw positioned adjacent to said pocket and spring means arranged to move the jaw into position to grip and hold a cap in said pocket, means for rotating the disk and thereby bringing the said pocket to a cap-receiving station, and means mounted separately from the disk and operable to move the said gripping jaw to a retracted position as said pocket is brought to the cap-receiving station, means for transferring a cap from said pocket to a container at a transfer station, including a chuck and a container holding device, the latter arranged to hold a container at said station with the chuck and container positioned at opposite sides of the disk and in register with the said pocket and cap therein, and means for imparting to the chuck a straight-line movement by which it is brought into engagement with the cap in said pocket and by a continuation of said movement carries the cap into engagement with the container.

JOHN HOHL.
RICHARD A. PIM.

References Cited in the file of this patent

UNITED STATES PATENTS

| Number | Name | Date |
|---|---|---|
| 1,760,859 | Lach | May 27, 1930 |
| 1,839,918 | Gustafson | Jan. 5, 1932 |
| 2,031,735 | Risser | Feb. 25, 1936 |
| 2,042,733 | Risser | June 2, 1936 |
| 2,130,317 | Clarke | Sept. 13, 1938 |
| 2,202,302 | Sickel | May 28, 1940 |
| 2,292,146 | Meunier | Aug. 4, 1942 |
| 2,506,819 | Sydow | May 9, 1950 |

FOREIGN PATENTS

| Number | Country | Date |
|---|---|---|
| 470,829 | Great Britain | Aug. 23, 1937 |
| 489,457 | Great Britain | July 27, 1938 |